J. T. A. LEWIS.
CAR-COUPLING.

No. 170,748. Patented Dec. 7, 1875.

Witnesses.
S. W. Piper
L. N. Moller

James T. A. Lewis.
by his attorney.
R. H. Eddy

UNITED STATES PATENT OFFICE.

JAMES T. A. LEWIS, OF EAST BOSTON, MASSACHUSETTS.

IMPROVEMENT IN CAR-COUPLINGS.

Specification forming part of Letters Patent No. 170,748, dated December 7, 1875; application filed October 7, 1874.

*To all whom it may concern:*

Be it known that I, JAMES T. A. LEWIS, of East Boston, of the county of Suffolk and State of Massachusetts, have invented a new and useful Improvement in Railway-Car Couplings; and do hereby declare the same to be fully described in the following specification, and represented in the following drawings, of which—

Figure 1:
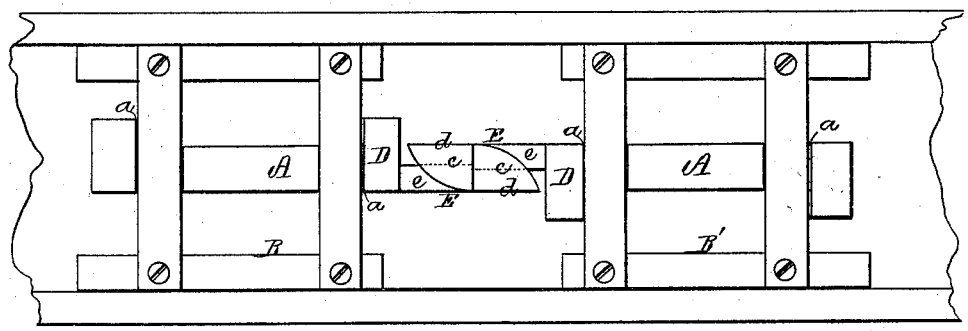
Figure 2:
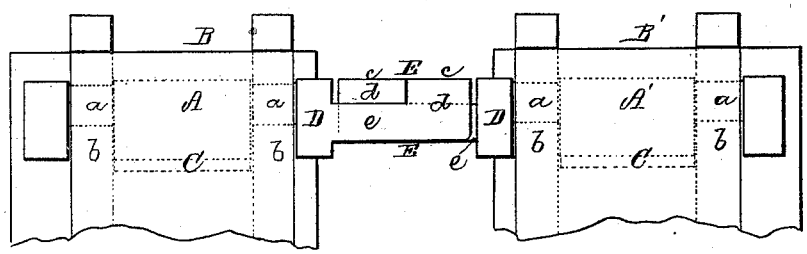
Figure 3:
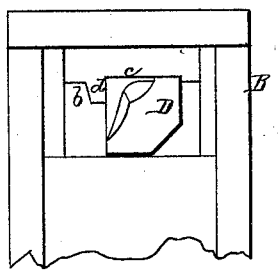

Figure 1 is a top view, and Fig. 2 a side elevation, of my improved coupling. Fig. 3 is an inner end view of one of the cammed catch-hooks, two of which co-operate in connecting two carriages.

My invention is a car-coupling composed of two cammed catch-hooks, two abutments, two rotary shafts and gravitating weights, or the equivalents of the latter, (as springs, for instance,) constructed, arranged, and combined substantially in the manner and to operate as hereinafter explained, it being, in practice, a very efficient means of engaging two railway-carriages, admitting of their being easily disconnected when occasion may require.

In the said drawings, A A' denote the two catch bars or shafts, each of which has two journals, *a a*, arranged in bearings *b b*, in one of two slide-frames, B B'. Each of the said catch-bars is provided with a weight, C, extended down from it, and operates, to maintain in a horizontal position, the upper face *c* of the catch-hook E projecting from such bar. There is fixed upon the inner end of each of the catch bars or shafts a head or abutment, D, from which there is projected eccentrically to the axis of rotation of the catch bar or shaft the shank *e* of the catch-hook head *d*. The said catch-hook head *d* projects not only above the shank, but inward from it, and with the shank is curved and beveled in manner as represented, such being in order that while either catch-hook may be in the act of being forced against the other in order to couple with it, either or both shall be revolved, so as to pass each other, and until each may bring up against the abutment of the other. This having taken place, the gravitating weight of each hook so revolved will be free to revolve the hook in the opposite way, so as to cause it to couple with the other hook. During the first rotary movement of the hook, in order to enable it to pass its fellow hook, the gravitating weight will be moved laterally and upward, more or less, after which it will descend and cause the hook to turn back and couple with the other.

By simply revolving either hook far enough the uncoupling of the two may be effected; but when coupled their gravitating weights will preserve them in engagement until such time as it may be desirable to have them disconnected.

I do not claim a gravitating car-coupling composed in part of a cammed hook and a round bunter, the latter being arranged over the hook, and nearly or about even with the inner edge of the cammed catch of the hook; the same being so that, when the catches are in conjunction, each will extend underneath its bunter.

In my car-coupling each abutment D is extended from the head of the catch-hook, projecting from it a distance somewhat greater than the length of said head, and both of the abutments are further arranged so that ends of the hooks shall bring up against such abutments in the act of coupling. With my arrangement of the abutments the coupling-hooks cannot be thrown up against them during a rebound or upward movement of a car, so as to cause disengagement of the coupling-hooks to take place, there being a liability of such when the bunter is arranged just above and nearly even with the base of the catch of the hook.

I therefore claim as my improvement—

In cammed hook-couplings, the gravitating and cammed hooks E E, provided with abutments D D for the ends of the said hooks to bring up against in the act of coupling, all being arranged as specified and shown.

JAMES T. A. LEWIS.

Witnesses:
R. H. EDDY,
J. R. SNOW.